United States Patent [19]
Lipsitz et al.

[11] 4,348,191
[45] Sep. 7, 1982

[54] ELECTRONIC GAME BOARD

[76] Inventors: Barry R. Lipsitz, 44 Purdy Rd. East, Norwalk, Conn. 06850; Charles D. Forman, 164 E. 83rd St., New York, N.Y. 10028

[21] Appl. No.: 201,922

[22] Filed: Oct. 29, 1980

[51] Int. Cl.³ .................................................. G09B 5/06
[52] U.S. Cl. .................... 434/308; 434/259; 434/340; 46/232
[58] Field of Search ............... 434/340, 259, 151, 169, 434/308, 318; 46/45, 232

[56] References Cited
U.S. PATENT DOCUMENTS

| | | | |
|---|---|---|---|
| 1,084,370 | 1/1914 | Smith | 434/151 |
| 2,416,959 | 3/1947 | Segal | 434/259 |
| 2,711,595 | 6/1955 | Sharp | 434/259 X |
| 3,568,336 | 3/1971 | Noble | 46/232 X |
| 3,748,748 | 7/1973 | Bevan et al. | 434/318 |
| 3,768,179 | 10/1973 | Woodford et al. | 434/308 |
| 4,246,827 | 1/1981 | Gazzola | 434/340 X |
| 4,314,423 | 2/1982 | Lipsitz et al. | 46/232 |

Primary Examiner—William H. Grieb

[57] ABSTRACT

An electronic game board produces realistic sounds when game pieces are properly placed thereon. The board has different areas which may be representative of different environments. The game pieces are representative of animals or objects each of which is typically found in one of the environments represented. When a game piece is placed on the board in the environment where the real life animal or object is found, an electronic circuit within the game board is triggered to make the same sound the real life animal or object makes. A different sound is produced for each different animal or object.

11 Claims, 5 Drawing Figures

ELECTRONIC GAME BOARD

The present invention relates to the class of games which utilize a board and articles adapted for placement on the board. More particularly, a gameboard is disclosed which includes sound generating means and depicts various environments into which articles, such as toy animals, can be placed. The placement of a particular article into a particular environment on the board activates the sound generating means to produce a sound peculiar to the article represented. Thus, for example, an article may be representative of a duck, and an environment on the game board may be representative of a pond. When the duck is placed in the pond, the sound generating means produces a "quack." If another area on the game board is representative of a farm and an article in the shape of a cow is placed therein, a "moo" sound will be generated. An electronic circuit in the game board is used to produce the sound, although other sound generating means; e.g., a phono record or tape, may alternatively be used. Each environmental area represented on the board may be keyed to accept only articles which represent entities normally found in that environment. Switching means are used to trigger the sound generating means to produce the appropriate sound for a given article which is present on the game board.

Past game boards have been passive in nature, acting primarily as maps on which tokens are placed and moved around. The game board of the present invention is active in nature, audibly rewarding the user when a token is placed in the area which represents a proper environment for that token. The game board of the present invention is easily adapted for use as an educational tool which, for example, may be used to teach young children about animals, the environment each animal typically inhabits and the sound the particular animal makes.

It is, therefore, an object of the present invention to provide a game board which is actuated for making a particular sound by a particular token.

A further object is to provide an entertaining teaching aid to teach young children the sound which different animals or objects make.

Yet another object is to provide a teaching aid which will assist children in learning the environments in which various objects and animals are found.

In accordance with the present invention, a game board is constructed which includes a base having at least one area adapted to receive different articles. Sound generating means is provided which is capable of producing a plurality of sounds. Switch means, responsive to the placement of different articles in areas on the game board, is provided to cause the sound generating means to produce different sounds.

A more complete understanding of the invention and the various objects and features thereof can be had by reference to the following drawings, wherein.

Figure 1:
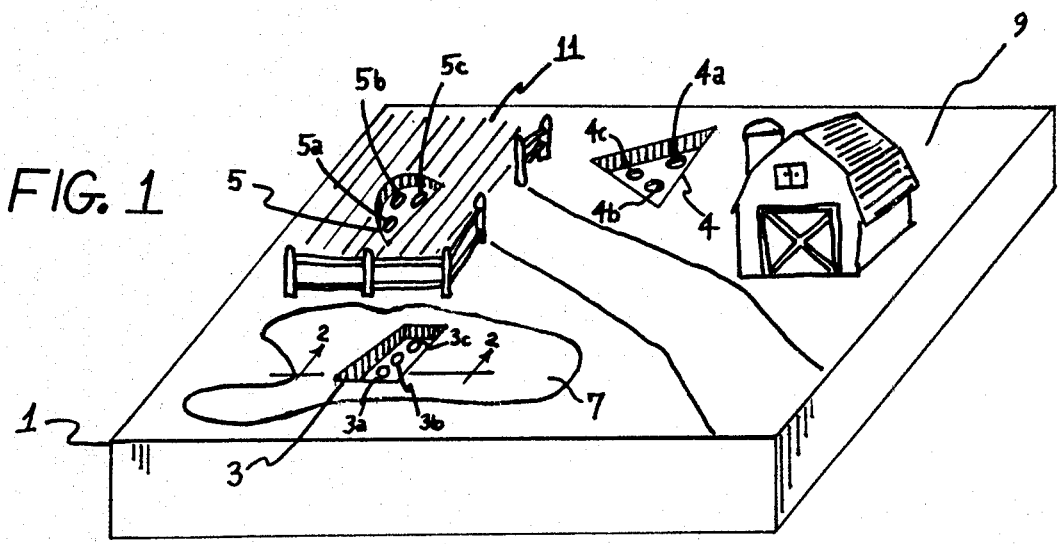
FIG. 1 is an isometric view of a game board.
Figure 3:
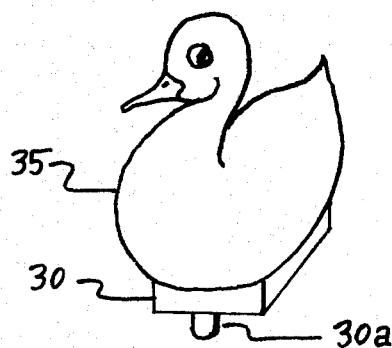
FIG. 3 is a drawing of an article in the form of a duck which fits into the game board.

Turning now to FIG. 1, a game board 1 is shown having areas 7, 9 and 11. Area 7 represents a pond, area 9 represents a farm barnyard and area 11 represents a field found on a farm. Within area 7 is receptacle 3 which is of an asymmetric shape. The asymmetric shape of receptacle 3 serves as a key so that only articles having a base of a corresponding shape will fit into it. The duck of FIG. 3 is an example of such an article. Since a duck is typically found in a pond, duck 35 of FIG. 3 will be manufactured to have a base 30 which fits into receptacle 3 of game board 1, but not into receptacles 4 or 5 of game board 1.

Figure 2:
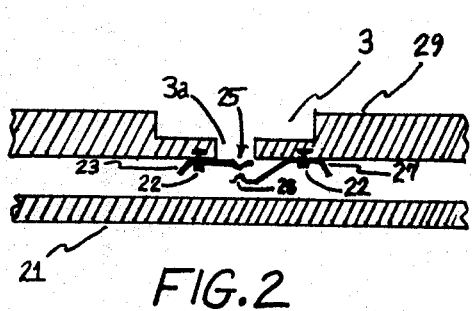
FIG. 2 is an enlarged drawing of plane 2—2 of FIG. 1.

Within receptacle 3 are sockets 3a, 3b and 3c. These sockets serve as inputs to an electronic circuit which generates different sounds. As shown in FIG. 2, under socket 3a is mounted a switch consisting of metal contact members 25 and 28. These contacts are affixed to the underside of the game board top by rivets 22 and may be connected to the electronic circuit at terminal ends 23 and 27. The top and bottom of the game board are designated in FIG. 2 by reference numerals 29 and 21 respectively. When a properly keyed object is placed into receptacle 3, a pin on the base of the object will protrude through one or more of sockets 3a, 3b and 3c. In the case of duck 35, pin 30a is positioned so that it will protrude into socket 3a, causing metal contact members 25 and 28 to contact each other and thereby close a switch. This switch closure will trigger an electronic circuit to produce a "quack" sound as will be described in greater detail below. Base 30 on duck 35 is shaped to fit into receptacle 3 on game board 1 and will not fit into either of receptacles 4 or 5. Thus, duck 35 can only be placed into the area on the game board which is designated as a pond. When the duck is placed into the pond, a quacking sound will be heard.

Other aquatic animals will have a base which is the same shape as base 30 of duck 35. The other such animals, however, will have pins in locations on the base different from where pin 30a is on duck 35. For example, a frog might have a pin in a location corresponding to socket 3b. This pin, when the frog is inserted into receptacle 3, would close a switch which causes the sound generating circuitry to produce a croaking sound. A motorboat placed in the pond; i.e., into receptacle 3, may have a pin which fits into socket 3c and causes a motor sound to be heard.

Figure 4:
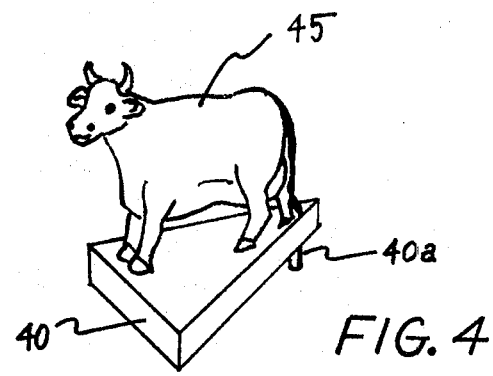
FIG. 4 is a drawing of an article in the form of a cow which fits into the game board.

Other animals or objects will have bases which fit into other areas on game board 1. The cow of FIG. 4 has base 40 which is keyed, through its triangular shape, to fit only into receptacle 4. Pin 40a will close a switch under socket 4a which causes the sound generating circuitry to produce a "moo" sound. Thus, when properly placed in the barnyard, the cow will moo. A horse may be provided with a pin corresponding to socket 4b which triggers the sound generating circuitry to produce a "neigh". A pig with a pin corresponding to socket 4c can cause an "oink" sound. The animals and objects cited herein are examples only and those skilled in the art will understand that virtually any area can be depicted on the game board, any animal or object can be provided and any appropriate sound can be produced.

In the game board of FIG. 1, area 11 represents a field. A tractor, for example, can be provided for insertion into receptacle 5 with pin(s) corresponding to any of sockets 5a, 5b and/or 5c causing a characteristic tractor motor sound to be produced by the sound circuitry.

Figure 5:
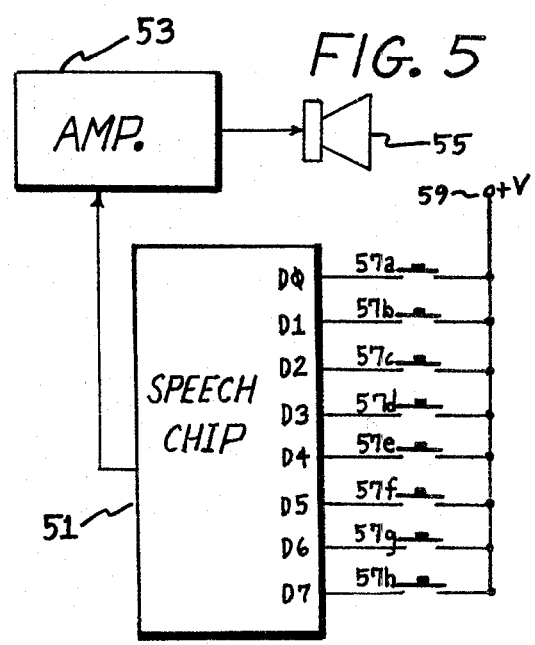
FIG. 5 is a block diagram of an electronic circuit for use in the game board.

FIG. 5 shows one embodiment of a sound generating circuit which may be used with the present invention. This circuit uses a speech synthesizer integrated circuit chip 51, such as one manufactured by General Instrument Corporation and designated the SPO256. This chip is a complete speech synthesis system capable of producing eight to 20 seconds of speech output from its internal 16K ROM and can be interfaced to external ROM for vocabulary expansion. In the game board of the present invention, the SPO256 is easily adapted for use, particularly if only eight different sounds are required. In this instance, no external ROM will be required and each of the eight data input lines D0–D7 will be activated by a logic "high" signal from voltage terminal 59 to trigger a different sound. Switches 57a–57h in FIG. 5 each correspond to board contact members of the type shown as reference numerals 25 and 28 in FIG. 2. Speech synthesizer chip 51 can be programmed so that a high signal on input D0 will cause a quacking sound. In such a case, switch 57a would be located under socket 3a as described above so that a "quack" results when the duck is placed in the board. As shown in FIG. 5, the output of speech synthesizer chip 51 is connected to the input of an audio amplifier 53 which drives speaker 55. Typically, amplifier 53 will include a 5 KHZ low pass filter to block out unwanted noise above this frequency. The required 5 V power supply and system clock are not shown in the block diagram as their use will be readily apparent to one skilled in the art.

The various desired sounds are preprogrammed into the SPO256 chip's internal ROM during chip manufacture. This "program" is developed and generated by the chip manufacturer using a fast mini-computer with a substantial data base and special purpose input/output devices. In order to obtain a speech synthesizer chip to produce, for example, eight animal sounds for a game board as shown in FIG. 1, one need only to supply to the chip manufacturer a tape recording of the specific sounds desired. The manufacturer will use this tape recording to produce the digital code required to be programmed into the chip's internal ROM for subsequent synthesis, by the chip, of the same sounds. If more sounds are required than can be stored in the chip's internal 16K ROM, additional external ROM can be added.

Other manufacturers, such as National Semiconductor, Texas Instruments and Matsushita, market their own versions of speech synthesizer chips which can alternatively be used to implement the present invention. Further, the sounds required in a game board of the type disclosed herein can be produced by other types of electronic circuits. One such circuit is disclosed in co-pending U.S. patent application Ser. No. 055,822 filed July 9, 1979, and entitled "Sound Producing Toy." That application discloses a circuit for making complex sounds through the use of a plurality of oscillators.

While a farm environment has been used herein as an example of an embodiment for the present invention, it will be appreciated that many other environments may be used. Examples of some of these are a zoo board; a city board with receptacles for fire engines, ambulances, etc.; a department store board; a gasoline station board which could have insertable automobiles, gasoline pumps and air pumps; a circus board, and the like. It should also be appreciated that where suitable, a human figure could be inserted in an appropriate environment on the game board to trigger the sound generating means to produce an appropriate word or phrase of speech.

It is further noted that other arrangements are possible for assuring that given articles cause sounds to be produced only when the articles are placed in the proper area on the board. Instead of the bases (e.g., base 30 on duck 35; base 40 on cow 45) being keyed to fit only in corresponding receptacles, electrical switch means may be designed to distinguish different articles and respond only to properly placed articles.

The above described arrangement is merely illustrative of the principles of the present invention. Numerous modifications and adaptations thereof will be readily apparent to those skilled in the art without departing from the spirit and scope of the present invention as recited in the following claims.

We claim:
1. Game board apparatus comprising:
a plurality of articles each representative of a different entity;
a board having at least one receptacle adapted to interchangeably receive at least two of said articles;
sound generating means for producing a plurality of sounds; and
switch means, coupled to said sound generating means and responsive to the placement of articles in said receptacle, for causing said sound generating means to produce different sounds for different articles placed in said receptacle.

2. The game board apparatus of claim 1 wherein said sound generating means comprises an electronic circuit.

3. The game board apparatus of claim 1 further comprising a plurality of different areas on said board, each area depicting a different environment, and wherein each area contains at least one of said receptacles.

4. The game board apparatus of claim 3 wherein said articles are representative of entities typically found in said environments and said sound generating means produces sounds peculiar to the entities represented.

5. The game board apparatus of claim 4 wherein said switch means causes said sound generating means to produce a sound only when an article is placed in the area depicting a proper environment for the entity represented by that article.

6. The game board apparatus of claim 5 wherein said sound generating means produces, upon the proper placement of an article on said board, a sound peculiar to the entity represented by that article.

7. The game board apparatus of claim 4 wherein said receptacles are differently shaped and each article has a base which is keyed by its shape to fit only into a correspondingly shaped receptacle.

8. The apparatus of claim 7 wherein said switch means comprises a plurality of electrical switches and each of said articles has a pin protruding from its base in a different location for actuating said switch means, whereby each different article actuates a different electrical switch to cause said sound generating means to produce a different sound.

9. Game board apparatus comprising:
a plurality of articles each representative of a different animal;
a base having a plurality of areas depicting different environments which different animals typically inhabit;
sound generating means for producing sounds peculiar to the animals represented by said articles; and switch means, responsive to the placement of different ones of said articles in said areas, for actuating said sound generating means to produce a sound peculiar to the animal represented by an article when the article is placed in an area.

10. Game board apparatus comprising:

a plurality of articles each representative of a different machine;

a base having a plurality of areas depicting different environments in which different machines are typically found;

sound generating means for producing sounds peculiar to the machines represented by said articles; and switch means, responsive to the placement of different ones of said articles in said areas, for actuating said sound generating means to produce a sound peculiar to the machine represented by an article when it is placed in an area.

11. The apparatus of claim 9 or 10 wherein said switch means actuates said sound generating means only when an article is placed in an area depicting a proper environment for the entity represented by that article.

* * * * *